United States Patent [19]

Maeder

[11] 4,039,908
[45] Aug. 2, 1977

[54] SYNCHRONOUS MOTOR HAVING A VARIABLE RELUCTANCE

[75] Inventor: Claude R. Maeder, Nancy, France

[73] Assignee: Pont-A-Mousson S.A., Nancy, France

[21] Appl. No.: 566,843

[22] Filed: Apr. 10, 1975

[30] Foreign Application Priority Data

May 22, 1974  France ................................ 74.18161

[51] Int. Cl.² .......................................... H02K 19/06
[52] U.S. Cl. ..................................... 318/166; 310/163
[58] Field of Search ................. 318/138, 166; 310/163

[56] References Cited

U.S. PATENT DOCUMENTS

| | | | |
|---|---|---|---|
| 3,509,392 | 4/1970 | Snowdon | 318/138 X |
| 3,519,183 | 7/1970 | Levine et al. | 318/138 X |
| 3,535,604 | 10/1970 | Madsen et al. | 318/138 |
| 3,621,312 | 11/1971 | Palmero | 318/138 X |
| 3,735,093 | 5/1973 | Kendall et al. | 318/138 X |
| 3,749,990 | 7/1973 | Harz | 318/166 |
| 3,866,104 | 2/1975 | Heine | 318/138 X |

*Primary Examiner*—Gene Z. Rubinson
*Attorney, Agent, or Firm*—Sughrue, Rothwell, Mion, Zinn and Macpeak

[57] ABSTRACT

A synchronous motor having a variable reluctance comprising a stator provided with poles each bearing an inductive winding and comprising radial teeth on their polar face. The synchronous motor further comprises a rotor which is coaxially disposed with respect to the stator and which is externally provided with radial teeth.

The windings, which are all identical and which are supplied with a threephase electric current, are connected in such a way that the rotating magnetic fields produced by the windings are closed through adjacent poles. In a motor having twelve poles, the windings (E) provided on the diametrically opposed poles are placed in series with a diode (D) to form a group (G) of elements. Each diode (D) is such that two diodes (D) connected respectively to two windings (E) provided on two adjacent poles permit the passage of oppositely directed electric currents.

The groups (G) of elements are connected in parallel in pairs in such a way that the windings which are thus connected together are provided on poles separated by two poles. Pairs (H) of groups (G) of elements are connected in a star or triangular assembly.

7 Claims, 4 Drawing Figures

|  | $t_0$ a $t_1$ | $t_1$ a $t_2$ | $t_2$ a $t_3$ | $t_3$ a $t_4$ | $t_4$ a $t_5$ | $t_5$ a $t_6$ |
|---|---|---|---|---|---|---|
| $P_1$ | N | N | N |  |  |  |
| $P_2$ | S | S |  |  |  | S |
| $P_3$ | N |  |  |  | N | N |
| $P_4$ |  |  |  | S | S | S |
| $P_5$ |  |  | N | N | N |  |
| $P_6$ |  | S | S | S |  |  |
| $P_7$ | N | N | N |  |  |  |
| $P_8$ | S | S |  |  |  | S |
| $P_9$ | N |  |  |  | N | N |
| $P_{10}$ |  |  |  | S | S | S |
| $P_{11}$ |  |  | N | N | N |  |
| $P_{12}$ |  | S | S | S |  |  |

SYNCHRONOUS MOTOR HAVING A VARIABLE RELUCTANCE

BACKGROUND OF THE INVENTION

1. Field of the Invention

The present invention relates to a synchronous motor having a variable reluctance. The synchronous motor according to the invention comprises a stator provided with a plurality of pairs of poles, each of which bears an inductive winding and the polar face of which is provided with radial teeth. The synchronous motor according to the invention further comprises a rotor which is coaxially disposed with respect to the stator and externally provided with radially positioned teeth.

2. Description of the Prior Art

In known motors of the afore-noted type, the inductive windings are constructed and connected in such a way that, when they are supplied with alternating electric current, they produce a rotating magnetic field which is closed through the diametrically opposed poles or through the poles adjacent to the diametrically opposed poles.

SUMMARY OF THE INVENTION

The present invention relates to a synchronous motor of the afore-noted type which is characterized in that the rotating magnetic fields produced by the inductive windings are closed through the adjacent poles.

By virtue of this feature of the rotating field, the output of the motor according to the invention is greater than the output of known motors of the same type.

Other objects, features, and advantages of the present invention will be made apparent in the following detailed description of various preferred embodiments of the invention provided with reference to the accompanying non-limitative drawings.

DESCRIPTION OF THE PREFERRED EMBODIMENTS

Figure 1:
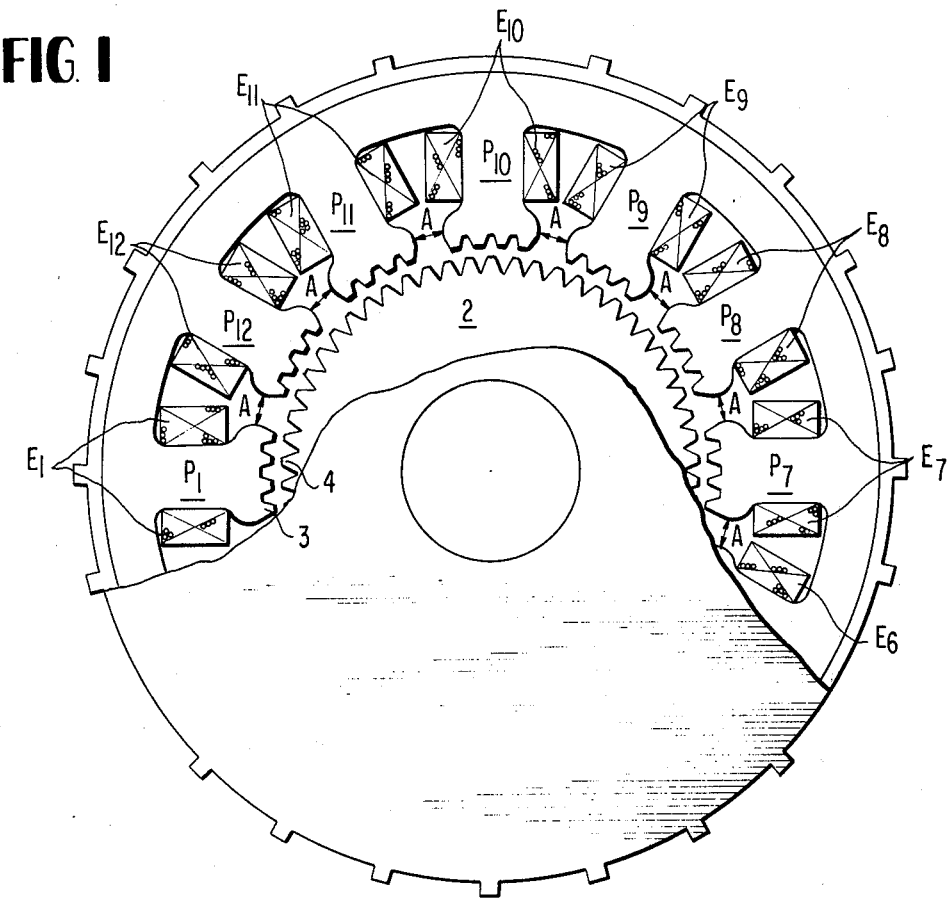
FIG. 1 is a diagrammatic sectional view of a motor according to the invention.
Figure 2:
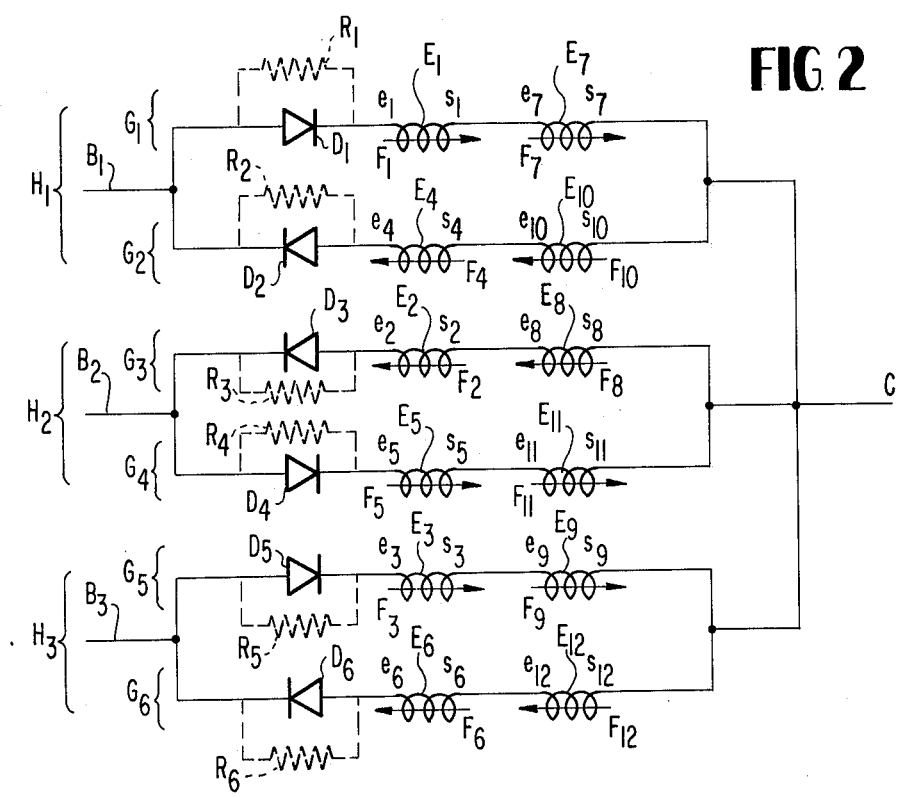
FIG. 2 is a diagrammatic view of the electrical connection system of a motor according to the invention (star assembly).

According to the embodiment shown in FIGS. 1 and 2, the invention relates to an electric motor having a variable reluctance comprising a stator 1 with 12 poles (P1 - P12). Each pole P bears a winding E.(E1 - E12 correspond respectively to the poles P1-P12). The motor according to the invention also comprises a steel rotor 2 which may have, for example, a laminated structure. The poles P are provided on their radial faces with radial teeth 3 which extend inwardly, and the rotor 2 is externally provided with radial teeth 4 which are identical to the teeth 3 of the poles P. The number of teeth 4 of the rotor 2 is two less than the number of teeth 3 of the poles P augmented by the number of teeth which could have been provided in the spaces A situated between the poles. The windings E of all the poles are identical.

The windings E are connected in a star assembly, each terminal B (B1-B3)of which is supplied in each phase U(U1-U3 respectively) with a three-phase sinusoidal electric current.

The terminal B1 is connected by way of a diode D1, which permits the passage of the positive half cycle of the electric current of phase U1, to the input $e$ 1 of the winding E1, the output $s$ 1 of which is connected to the input $e$ 7 of the winding E7, the output $s$ 7 of which is connected to the neutral point C. The same terminal B1 is connected through the diode D2, which permits passage of the negative half cycle of the current of phase U1, to the input $e$ 4 of the winding E4, the output $s$ 4 of which is connected to the input $e$ 10 of the winding E10, the output $s$ 10 of which is connected to the neutral point C.

In the same way, the terminal B2 is connected to the neutral point C, either successively through a diode D3, which permits passage of the negative half cycle of current of the phase U2, through the input $e$ 2 and the output $s$ 2 of the winding E2 and through the input $e$ 8 and then the output $s$ 8 of the winding E8, or successively through a diode D4, which permits passage of the positive half cycle of the current of phase U2, through the input $e$ 5 and the output $s$ 5 of the winding E5 and through the input $e$ 11 and the output $s$ 11 of the winding E11.

Similarly, the terminal B3 is connected to the neutral point C, either successively through a diode D5, which permits passage of the positive current half cycle of phase U3, through the input $e$ 3 and then the output $s$ 3 of the winding E3 and through the input $e$ 9 and then the output $s$ 9 of the winding E9, or successively through a diode D6, which permits passage of the negative current half cycle of the phase U3, through the input $e$ 6 and then the output $s$ 6 of the winding E6 and through the input $e$ 12 and then the output $s$ 12 of the winding E12.

Each diode D is thus disposed in series with two windings E borne by diametrically opposed poles to form groups G of elements (G1-G6 formed respectively by D1-E1-E7, D2-E4-E10, D3-E2-E8, D4-E5-E11, D5-E3-E9, D6-E6-E12).

The diodes D of the groups G are such that the two diodes connected to the windings provided on adjacent poles permit passage of oppositely directed currents.

In addition, the groups G are connected in pairs H (H1, H2, H3 corresponding to G1-G2, G3-G4, G5-G6, respectively) by disposing in parallel two selected groups of elements in such a way that the poles P bearing the windings of one group are separated by two poles from the poles P bearing the windings of another group G forming the pair H.

Figures 3, 4:
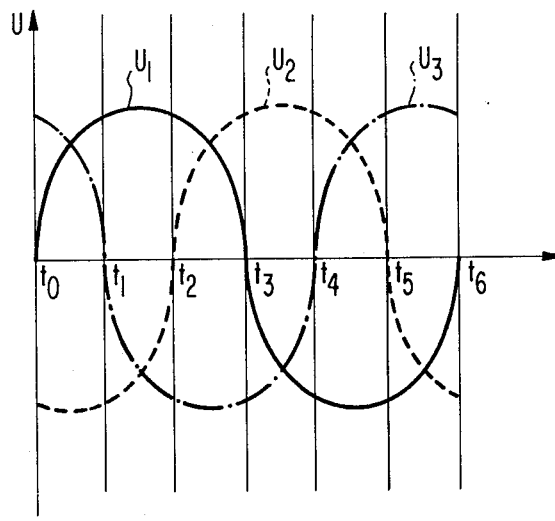
FIG. 3 is a diagram showing the three-phase electric current voltages supplied as a function of time.
FIG. 4 is a table showing the polarity of the poles of the three-phase electric current supply as a function of time.

The above-described motor operates as follows:

The terminals B (B1-B3) are supplied with a sinusoidal, three-phase alternating electric current (U1-U3 respectively). The electrical voltages supplied to the terminals B1, B2, B3 are variable as a function of time. If the period of the sinusoidal current waves is designated by T, it is possible to represent the voltage of each phase as in FIG. 3. In FIG. 3, the phase U1 is represented by the continuous line, the phase U2, which is offset by (T/3) with respect to the phase U1, is represented by the discontinuous line, and the phase U3, which is offset by (2 T/3) with respect to the phase U1, is represented by the line of mixed dots dashes.

During the period $t\,0$ to $t\,1$, the voltages of the two phases U1 and U3 are positive and the voltage of phase U2 is negative accordingly at this time the terminals B1 and B3 are at a positive voltage and the terminal B2 is at a negative voltage.

By virtue of the positive voltage of the terminal B1, the diode D1 is conductive, and the windings E1 and E7 are crossed by current. The current passes in the direction of the arrows F1 and F7, thus producing north poles N in the poles P1 and P7. The diode D2 is not conducting current, and the windings E4 and E10 are not traversed by current.

By virtue of the positive voltage of the terminal B2, the diode D3 is conductive, and the windings E2 and E8 are thus crossed by current. The current passes in the direction of the arrows F2 and F8, thus producing south poles S in the poles P2 and P8. The diode D4 is not conductive, and the windings E5 and E11 are thus not traversed by current.

By virtue of the positive voltage of the terminal B3, the diode D5 is conductive, and the windings E3 and E9 are crossed by current. The current passes in the direction of the arrows F3 and F4, thus producing north poles N in the poles P3 and P9. The diode D6 is not conductive, and the windings E6 and E12 are not traversed by current.

During the period $t\,0$ to $t\,1$, the south pole P2 situated between two north poles P1 and P3 produces with the same a magnetic field which is closed within themselves. The same applies to the south pole P8 and the north poles P7 and P9.

During the period $t\,1-t\,2$, the voltage of the phase u1 is positive and the voltage of the phases U2 and U3 is negative. As a result, the terminal B1 is at a positive voltage, and the terminals B2 and B3 are at a negative voltage.

by virtue of the positive voltage of the terminal B1, the diode D1 is constantly conductive, and the windings E1 and E7 are constantly traversed by current. The current flows in the direction of the arrows G1 and F7, thus producing north poles N in the poles P1 and P7. As the diode D2 is not conductive, the windings E4 and E10 are not traversed by current.

By virtue of the negative voltage of the terminal B2, the diode D3 is constantly conductive, and the windings E2 and E8 are constantly traversed by current. The current flows in the direction of the arrows F2 and E8, thus producing south poles S in the poles P2 and P8. As the diode D4 is not conductive, the windings E5 and E11 are not traversed by current.

By virtue of the negative voltage of the terminal B3, the diode D6 becomes conductive, and the windings E6 and E12 are then traversed by current. The current flows in the direction of the arrows F6 and F12, thus producing south poles S in the poles P6 and P12. As the diode D5 is no longer conductive, the windings E3 abd E9 are not traversed by current.

During the period $t\,1$ to $t\,2$, the north poles P1 situated between two adjacent south poles P2 and P12 produces a magnetic field which is closed through these poles. Similarly, the north poles P7 situated between two south poles P6 and P8 produce a magnetic field which is closed through these poles.

During the period $t\,2$ to $t\,3$, the voltages of the two phases u1 and U2 are positive while the voltage of phase U3 is negative. As a result, the terminals B1 and B2 are at a positive voltage, and the terminal B3 is at a negative voltage.

By virtue of the positive voltage of the terminal B1, the diode D1 is constantly conductive, and the windings E1 and E7 are constantly traversed by current. The current flows in the direction of the arrows F1 and F7, thus producing north poles N in the poles P1 and P7. Meanwhile, the diode D2 is not conductive, and the windings E4 and E6 are not traversed by current.

By virtue of the positive voltage of the terminal B2, the diode D3 is no longer conductive, and the windings E2 and E8 are thus not traversed by current, whereas the diode D4 becomes conductive and causes the windings E5 and E11 to be traversed by current. The current flows in the direction of the arrows F5 and F11, thus producing north poles N in the poles P5 and P11.

By virtue of the negative voltage of the terminal B3, the diode D5 is still not conductive, and the windings E3 and E9 are still not traversed by current, whereas the diode D6 is conductive, and the windings E6 and E12 are traversed by current. The current flows in the direction of the arrows F6 and F12, thus producing south poles S in the poles P6 and P12.

During the period $t\,2-t\,3$, the south poles P6 is situated between two north poles P5 and P7, thus producing a magnetic field which is closed through these poles.

During the period $t\,3-t\,4$, the voltage of the phase U2 is positive, and the voltages of phases U1 – U3 are negative. As a result, the terminal U2 is at a positive voltage, and the terminals B1 and B3 are at a negative voltage.

By virtue of the negative voltage of the terminal B1, the diode D1 is no longer conductive, and the windings E1 and E7 are not traversed by current, whereas the diode D2 becomes conductive and the windings E4 and E10 are traversed by current. The current flows in the direction of the arrows F4 and F10, thus producing south poles S in the corresponding poles P4 and P10.

By virtue of the positive voltage of the terminal B2, the diode D3 is not conductive, and the windings E2 and E8 are not traversed by current, whereas the diode D4 is conductive and the windings E5 and E11 are traversed by current. The current flows in the direction of the arrows F5 and F11, thus producing north poles N in the poles P5 and P11.

By virtue of the negative voltage of the terminal B3, the diode D5 is not conductive, and the windings E3 and E9 are not traversed by current, whereas the diode D6 is conductive and the windings E6 and E12 are traversed by current. The current flows in the direction of the arrows F6 and F12, thus producing south poles S in the poles P6 and P12.

During the period $t\,e$ to $t\,4$, the north poles P5 is situated between two adjacent south poles P4 and P6, thus producing a magnetic field which is closed through these poles. Likewise, the north poles P11 situated between two adjacent south poles P10 and P12 also produces a magnetic field which is closed though these poles.

During the period $t\,4-t\,5$, the voltage of phase U1 is negative and the voltages of the two phases U2 and U3 are positive accordingly the terminal B1 is then at a negative voltage, and the terminals B2 and B3 are at a positive voltage.

By virtue of the negative voltage of the terminal B1, the diode D1 is not conductive, and the windings E1 and E7 are not traversed by current, whereas the diode D2 is conductive and the windings E4 and E10 are traversed by current. The current flows in the direction of the arrows F4 and F10, thus producing south poles S in the poles P4 and P10.

By virtue of the positive voltage of the terminal B2, the diode D3 is not conductive, and the windings E2 and E8 are not traversed by current, whereas the diode D4 is conductive and the windings E5 and E11 are traversed by current. The current flows in the direction of the arrows F5 and F11, thus producing north poles in the poles P5 and P11.

By virtue of the positive voltage of the terminal B3, the diode D5 is conductive, and the windings E3 and E9 are traversed by current. The current flows in the direction of the arrows F3 and F9, thus producing north poles in the poles P3 and P9. As the diode D6 is not conductive, the windings E4 and E10 are not traversed by current.

During the period $t$ 4–$t$ 5, the south poles P4 is situated between two adjacent north poles P3 and P5, and a magnetic field is produced which is closed through these poles. Similarly, the south pole P10 is situated between two adjacent north poles P9 and P11, thus producing a magnetic field which is closed through these poles.

During the period $t$ 5 to $t$ 6, the voltages of the two phases U1 and U2 are negative, whereas the voltage of the phase U3 is positive, and, as a result, the terminals, B1 and B2 are at this time at a negative voltage and the terminal B3 at a positive voltage.

By virtue of the negative voltage of the terminal B1, the diode D1 is not conductive, and the windings E1 and E7 are not traversed by current, whereas the diode D2 is conductive and the windings E4 and E10 are traversed by current. The current flows in the direction of the arrows F4 and F10, thus producing south poles S in the poles P4 and P10.

by virtue of the negative voltage of the terminal B2, the diode D3 becomes conductive, and the windings E2 and E8 are then traversed by current. The current flows in the direction of the arrows F2 and F8, thus producing south poles S in the poles P2 and P8. At this time the diode D4 is not conductive, and the windings E5 and E11 are not traversed by current.

By virtue of the positive voltage at the terminal B3, the diode D5 is conductive, and the windings E3 and E9 are traversed by current. The current flows in the direction of the arrows F3 and F9, thus producing north poles N in the poles P3 and P9. As the diode D6 is not conductive at this time, the windings E6 and E12 are not traversed by current.

During the period $t$ 5–$t$ 6, the north pole P3 is situated between two adjacent south poles P2 and P4 a magnetic field is produce which is closed through these poles. As the north pole P9 is situated between the adjacent south poles P8 and P10, a magnetic field is also produced which is closed through these poles.

Thus, the situation would be similar for all the periods T during which the terminals B1, B2 and B3 are supplied with a sinusoidal three-phase alternating current. The table represented in FIG. 4, which is in the form of a grid with the rows corresponding to different poles and the columns to the periods of time during which the voltages are not subject to a change of sign, indicates the polarity of each of the poles as a function of time. When a square of the grid contains a sign N, it indicates that the corresponding pole is a north pole during the period of time in point, and when a square of the grid contains a sign S, it indicates that the corresponding pole is a south pole during the period of time in point.

From the table shown in FIG. 4 we not that, irrespective of the period of time in question, the group of three adjacent poles of which the windings are traversed by current, is such that the median pole has an opposite polarity to that of its two adjacent poles and that accordingly the magnetic field produced by these adjacent poles is closed through the same. On the other hand, two series of magnetic fields are produced which are closed through adjacent poles. These two series of magnetic fields are diametrically opposed. This table also shows that a rotating field is definitely involved, since excited poles are offset from one period of time to the next.

The creation of the rotating magnetic field and the fact that the number of teeth of the stator and of the rotor are not identical cause the rotor to rotate. When the teeth of the poles P1 and P7 are situated opposite the teeth of the rotor 2 during the period $t$ 1–$t$ 2, the reluctance at the three poles P1, P2, and P12 and at the other three poles P6, P7, and P8 is minimal, whereas the reluctance at the other poles is not minimal. During the period $t$ 2 to $t$ 3, the rotor tends to rotate in such a way that the relucatance between the three poles P1, P12, and P11 and the rotor 2 is minimal. This minimal reluctance is obtained when the teeth of the pole P12 and the teeth of pole P6 are situated opposite the teeth of the rotor 2. The rotor is thus caused to rotate, and the same process is repeated for each period of time such that the rotor 2 is driven in rotation at a synchronous rate. This synchronous rate constitutes a fraction of the rate of rotation of the rotating magnetic field and is a function of the number of teeth of the rotor.

By virtue of the invention, it is possible to obtain a motor wherein the magnetic fields which are produced are rotating magnetic fields which are closed through adjacent poles. In this way, it is possible to obtain an improved output over known motors. Given a constant couple and a constant voltage, the absorbed intensity is about 1½ times lower in an assembly according to the invention than in assemblies and connection systems of known motors.

One variant of the invention consists in disposing in parallel on each diode D(D1–D6) a large electrical resistance R (R1–R6) (of several thousand ohms). This resistance makes it possible to circulate a low electrical current in the windings not traversed by current as a result of blocking the diode which controls these windings. When the windings are supplied with a low current in this way, they produce a coercive current which is sufficient to cancel out the harmful remanent induction.

Other variants of the invention comprise the following features:

a motor having six poles each bearing a winding which replaces the two diametrically opposed windings of a group of elements G, a motor having 12 poles as described above, the windings in an individual group G of elements being disposed in parallel, a motor having $n$ poles, $n$ being a multiple of the number 6 and each pole bearing a winding; the windings on every sixth pole being mounted in series or in parallel in a particular group G of elements.

Another variant of the invention consists in replacing the star assembly described and represented in FIG. 2 by a triangular arrangement.

Another variant of the invention consists in replacing the three-phase sinusoidal alternating current supply and the diodes D by a source supplying correctly dephased triangular or pseudo-triangular signals.

What is claimed is:

1. In a synchronous motor having a variable reluctance and supplied with three-phase electric current, said motor comprising a stator having a polar face provided with radial teeth and a non-magnetic rotor which is coaxially disposed with respect to the stator and which is externally provided with radial teeth, the improvement wherein:
   a. the stator is provided with $3n$ pairs of poles (P) where $n$ is a positive integer, each of said poles (P) bearing at least one inductive winding (E) and the inductive windings of all the poles (P) being identical;
   b. the inductive windings (E) are arranged in groups of six in which each of said inductive windings (E) is connected to a diode (D) to form a group (G) of diode (D) - inductive winding (E) elements;
   c. each diode (D) is such that two diodes (D) connected respectively to two inductive windings (E) provided on two adjacent poles (P) permit the passage of oppositely directed electric currents;
   d. three pairs (H) of groups (G) of elements are formed by disposing in parallel two groups (G1-G2, G3-G4, G5-G6) of elements which are selected in such a way that the inductive windings which are thus assembled are provided on poles (P) separated by two other poles (P); and
   e. the excited poles (P) are always grouped in threes the middle one of which produces an oppositely directed magnetic flow to the two adjacent poles (P), whereby the rotating magnetic fields produced by inductive windings (E) are closed through adjacent poles (P) and only half of the inductive windings (E) are supplied with current at any given instant.

2. A synchronous motor as claimed in claim 1, wherein the motor comprises six poles.

3. A synchronous motor as claimed in claim 1, wherein the the windings provided on every sixth pole are connected in the same group (G) of elements.

4. A synchronous motor as claimed in claim 1, wherein the motor comprises twelve poles bearing twelve windings, the winding provided on the diametrically opposed poles being connected in the same group (G) of elements.

5. A synchronous motor according to claim 1, wherein the pairs (H) of groups (G) of elements are connected in a star assembly.

6. A synchronous motor as claimed in claim 1, wherein an electrical resistance of several thousands of ohms is disposed in parallel on each diode.

7. A synchronous motor as claimed in claim 1, wherein each pair (H) of groups (G) of elements is supplied by one phase of a three-phase sinusoidal alternating electric current.

* * * * *